(12) United States Patent
Eisele

(10) Patent No.: US 6,517,790 B1
(45) Date of Patent: Feb. 11, 2003

(54) CONVERTING FLUORGYP TO CALCIUM SULFATE

(75) Inventor: Dennis J. Eisele, Victoria, TX (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/164,466

(22) Filed: Jun. 6, 2002

Related U.S. Application Data

(60) Provisional application No. 60/365,499, filed on Mar. 18, 2002.

(51) Int. Cl.[7] ............................................ C04B 11/26
(52) U.S. Cl. ..................... 423/170; 423/555; 106/765; 106/772
(58) Field of Search ................. 423/170, 555; 106/765, 772

(56) References Cited

U.S. PATENT DOCUMENTS

| | | | |
|---|---|---|---|
| 4,174,974 A | 11/1979 | Fondriest | 106/103 |
| 4,402,922 A * | 9/1983 | Gaynor et al. | 423/164 |
| 4,451,295 A | 5/1984 | Sprouse | 106/89 |
| 4,935,211 A * | 6/1990 | Azar | 423/171 |

FOREIGN PATENT DOCUMENTS

| | | | |
|---|---|---|---|
| CN | 1156130 | * | 8/1997 |
| CN | 1292361 | * | 4/2001 |
| EP | 280000 | | 2/1987 |

OTHER PUBLICATIONS

"Granulated Fluorogypsum—A controlling agent for the setting time of cement" Novosadov et al. Tsement (1978), (6), 15–16.*

* cited by examiner

*Primary Examiner*—Paul Marcantoni
(74) *Attorney, Agent, or Firm*—Glenn E. Klepac

(57) ABSTRACT

Fluorgyp is converted to calcium sulfate by reacting sulfuric acid in the fluorgyp with calcium carbonate having a small particle size. The resulting product is useful as a set retarding agent for cement.

13 Claims, 1 Drawing Sheet

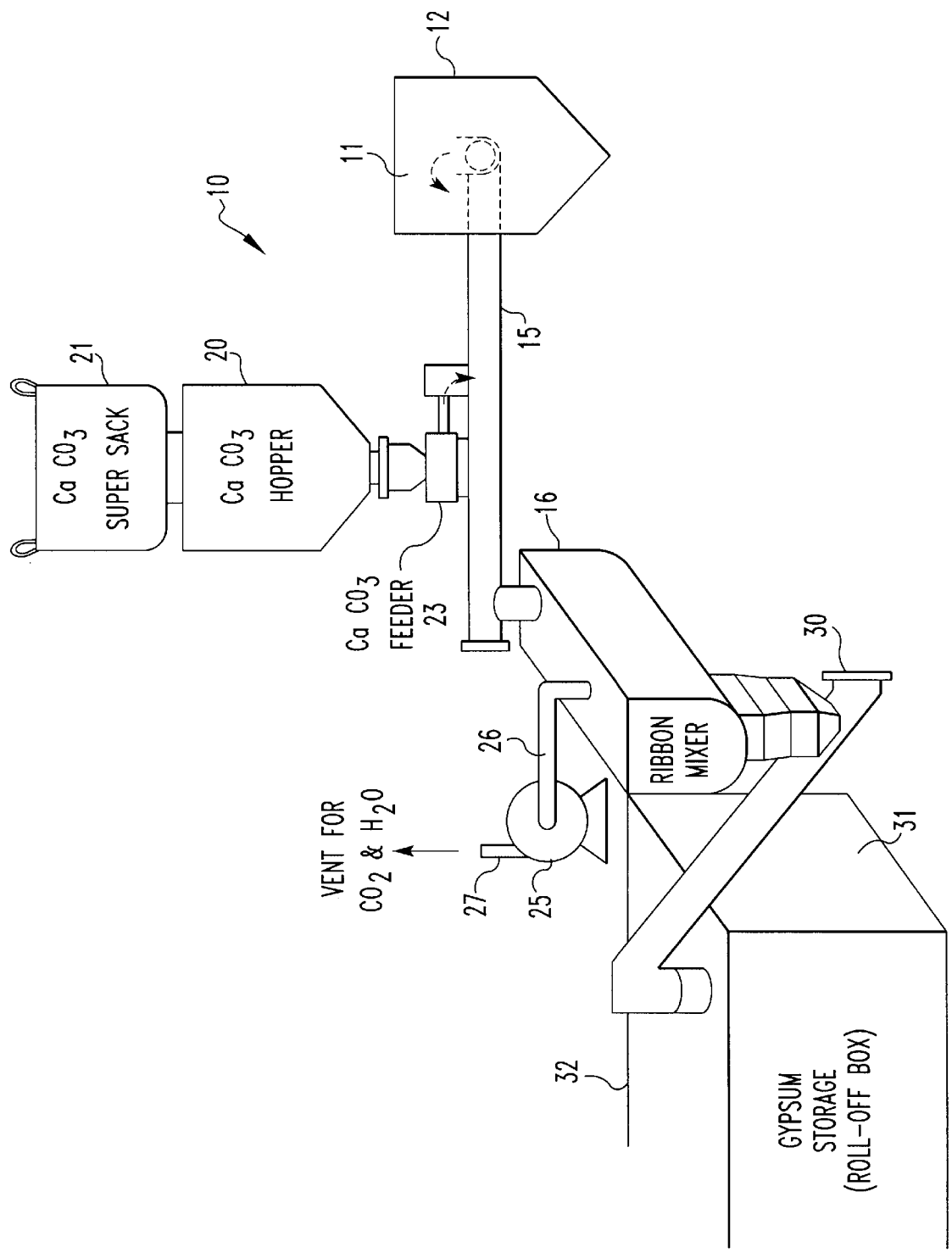

CONVERTING FLUORGYP TO CALCIUM SULFATE

PENDING RELATED APPLICATION

This application claims the benefits under 35 U.S.C. 120 of U.S. Provisional Application Serial No. 60/365,499 filed Mar. 18, 2002 and entitled "Converting Fluorgyp to Calcium Sulfate."

FIELD OF THE INVENTION

The present invention relates to production of calcium sulfate from fluorgyp.

BACKGROUND OF THE INVENTION

When producing hydrogen fluoride (HF) gas from fluorspar and sulfuric acid in kilns, significant quantities of gypsum are produced. In fact, more pounds of gypsum are produced than pounds of hydrogen fluoride gas. The gypsum from the production of hydrogen fluoride is in the anhydrous form and is referred to as "fluorgyp", since it usually contains 1 to 2 percent unreacted calcium fluoride. The fluorgyp from a hydrogen fluoride producing kiln will also contain a low level of unreacted sulfuric acid. The level of the unreacted sulfuric acid depends on the particular equipment used to generate hydrogen fluoride. The level usually ranges from 0.1 to 4 percent.

Aluminum fluoride is typically manufactured in a two-step process. First, hydrogen fluoride gas is generated from fluorspar and sulfuric acid in kilns. Second, the hydrogen fluoride gas is then reacted with alumina trihydrate in a three stage fluidized bed reactor. For every pound of aluminum fluoride produced, 2.73 pounds of fluorgyp are produced.

For hydrogen fluoride and aluminum fluoride production the fluorgyp must be neutralized and sent to a storage area. Very large stacks of fluorgyp are a common sight around hydrogen fluoride and aluminum fluoride plants. At the one aluminum fluoride plant, the fluorgyp is slurried in a water stream and pumped to a large containment area where it is neutralized with excess caustic from a nearby alumina plant. The solids are allowed to settle in the containment area and the water is recirculated back to the aluminum fluoride plant as the carrier medium.

A market that uses large volumes of gypsum is Portland cement. In the production of cement, gypsum is used as a set retarding agent. Without gypsum the cement will harden too fast and not give the construction industry the time needed to pour and finish the concrete in the field. In addition, when cement sets too fast, excess heat is generated which can lower the final strength of the concrete produced. Chemically speaking, a set retarding agent is needed in cement to slow down the hydration of C3A (tricalcium aluminate). The set retarding properties are determined by the solubility of the $(SO_4)^{-2}$ ion, which coats the C3A particles.

Historically the cement industry has used calcium sulfate dihydrate in the mineral form because it was available at a low price. However, anhydrous calcium sulfate will also function as a set retarding agent for cement because the solubility of anhydrous calcium sulfate in water is only slightly lower than that of the dihydrate. For Portland type I and II cements, the dihydrate form of gypsum is usually added at a level of approximately 3 to 4 percent.

A principal objective of the present invention is to convert fluorgyp to calcium sulfate useful as a set retarding agent for cement.

An advantage of the present invention is that sulfuric acid in the fluorgyp is neutralized in a solid phase reaction, so that the resulting product is a dry powder rather than a wet cake.

BRIEF DESCRIPTION OF THE DRAWINGS

The sole FIGURE is a schematic diagram of an apparatus for converting fluorgyp to calcium sulfate in accordance with the invention.

DETAILED DESCRIPTION OF THE PREFERRED EMBODIMENT

Fluorgyp discharged from the kilns of hydrogen fluoride production plants may contain about 0.1–4 wt % and typically contains about 2–4 wt. % sulfuric acid. The fluorgyp typically also contains about 1–2 wt. % unreacted calcium fluoride.

The sulfuric acid in fluorgyp must be neutralized so that the calcium sulfate in fluorgyp is suitable for use as a set retarding agent in the cement industry. One requirement of the neutralization process is that all reactants be kept in the solid phase, so that the product is a dry powder rather than a wet cake. For this purpose, powdered calcium carbonate is used as the neutralizing agent. The calcium carbonate has a small particle size- preferably about 15 microns or less average, more preferably about 10 microns or less, and about 8 microns average particle size in a particularly preferred embodiment. Calcium carbonate is preferably fed to fluorgyp in an amount slightly in excess of that needed to neutralize the sulfuric acid. A 2–4% excess is usually provided. Generally, calcium carbonate fed to the reaction amounts to about 6–10% by weight of the acidic gypsum.

Upon neutralization of sulfuric acid there is a slight evolution of carbon dioxide and water vapor, which must be removed. If necessary, the product is calcined at an elevated temperature above 100° C. (212° F.) to remove water. The final product is a dry powder.

In the pilot plant apparatus 10 shown in FIG. 1, powdered fluorgyp 11 is contained in a box 12. A 6 inch diameter screw feeder 15 conveys the fluorgyp 11 to a ribbon mixer 16. Powdered calcium carbonate 20 having an average 8 micron particle size is fed from supersacks 21 into a hopper 22 and then through a carbonate feeder 23 into the screw feeder 15. The feeder 23 provides calcium carbonate in a slight excess of the amount needed to neutralize sulfuric acid in the fluorgyp.

The calcium carbonate neutralizes sulfuric acid in the ribbon mixer 16. Carbon dioxide and water vapor evolved during neutralization are removed from the mixer 16 by a fan 25 through an outlet 26 and a vent 27.

A screw auger 30 removes the product 31 to a gypsum storage box 32. The gypsum product 31 contains low levels of impurities, as shown by the following typical analysis.

TABLE 1

| Element | Result | Units |
| --- | --- | --- |
| Al | 0.048 | % |
| Na | <0.05 | % |
| Si | 0.039 | % |
| Fe | 0.094 | % |
| Ca | 31 | % |
| Mg | 0.024 | % |
| K | <0.01 | % |
| Cu | <0.005 | % |
| Mn | 0.009 | % |
| Ni | 0.007 | % |
| Sb | <3 | ug/g |
| Cr | 0.008 | % |
| Zn | <0.005 | % |
| Ti | <0.005 | % |

TABLE 1-continued

| Element | Result | Units |
|---|---|---|
| V | <0.01 | % |
| Pb | <3 | ug/g |
| Sn | <0.05 | % |
| B | <0.005 | % |
| Be | <0.005 | % |
| Cd | <0.005 | % |
| Zr | <0.005 | % |
| As | <3 | ug/g |
| Ba | 0.007 | % |
| Se | <0.01 | % |
| Li | <0.01 | % |
| Mo | <0.01 | % |
| Ga | <0.01 | % |
| Ag | 0.005 | % |
| Sr | 0.007 | % |
| P | <0.01 | % |
| Bi | <0.01 | ug/g |
| Hg | <0.1 | ug/g |
| Tl | <3 | ug/g |
| Ta | <0.005 | % |
| S (by ICP) | 25 | % |
| S (by LECO) | 21 | % |

Gypsum made in accordance with the invention is useful as an ingredient of cement. Portland cement mixes containing predominately calcium aluminate cement may also contain about 1–5 wt. % gypsum, preferably about 3–4 wt. %. Several trial lots of cement have been produced with gypsum made in accordance with the invention, and all cements made have met applicable quality standards.

The fine particle size of gypsum made by the present invention translates into a competitive advantage because the gypsum can be added to the discharge of a cement clinker grinding ball mill. This results in an energy savings compared with natural gypsum in rock form, which must be co-ground with the cement clinker to provide an acceptable particle size.

EXAMPLES

Two 4 kg batches of cement were produced from a clinker with the addition of Terra Alba® dihydrate gypsum as the control and gypsum made from fluorgyp as the test sample. Both batches of cement were identical in fineness. The level of $SO_3$ was set at 3.0 percent in both batches. The cements were subjected to two tests, time of setting by Vicat needle ASTM (C191) and compressive strength of cement mortars ASTM (C109). The following test results compare the requirements of ATSM C150 standard specifications for Type 1 cements.

Test Results

TABLE 2

Time of Setting

| Test | ASTM C150 | Fluorgyp | Natural Gypsum |
|---|---|---|---|
| Initial Set Time | 45 min. minimum | 115 min. | 145 min. |
| Final Set Time | 375 min. maximum | 210 min | 255 min. |

TABLE 3

Cement Strength as a Function of Time

| Age (days) | ASTM C150 (psi) | Fluorgyp (psi) | Natural Gypsum (psi) |
|---|---|---|---|
| 2 | 1740* | 1940 | 2140 |
| 3 | 1740 | 3840 | 3840 |
| 7 | 2760 | 4290 | 4730 |
| 28 | 4060 | 5350 | 5310 |

*Required for Type III cement- high early strength

The test results summarized above support these conclusions:

1. Cement containing gypsum from fluorgyp met the standard specifications for compressive strength and time of setting.
2. The difference in test results between the cement made with natural gypsum and from fluorgyp was insignificant.

Having described the presently preferred embodiments, it is to be understood that the invention may be otherwise embodied within the scope of the appended claims.

What is claimed is:

1. A process for converting fluorogypsum to calcium sulfate useful as a set retarding agent for cement, comprising
   (a) providing powdered fluorogypsum comprising calcium sulfate contaminated with sulfuric acid, and
   (b) reacting said sulfuric acid in the fluorgypsum with calcium carbonate thereby neutralizing at least most of said sulfuric acid, the resulting product comprising calcium sulfate.
2. The process of claim 1, wherein said fluorogypsum comprises a by-product from manufacture of hydrogen fluoride in which fluorspar is reacted with sulfuric acid.
3. The process of claim 1, wherein said fluorogypsum contains about 0.1–4 wt. % sulfuric acid.
4. The process of claim 1, wherein said fluorogypsum contains about 2–4 wt % sulfuric acid.
5. The process of claim 1, wherein said calcium carbonate has an average particle size of about 15 microns or less.
6. The process of claim 1, wherein said calcium carbonate has an average particle size of about 10 microns or less.
7. The process of claim 1, wherein step (b) is performed without adding water.
8. The process of claim 1, wherein the reaction of sulfuric acid with calcium carbonate in step (b) produces water, and further comprising
   (c) calcining said product to remove water.
9. The process of claim 1, wherein said product has a pH of about 7–8.
10. The process of claim 1, wherein said product has an average particle size of about 10 microns or less.
11. The process of claim 1, wherein product is useful as a set retarding agent for cement.
12. The process of claim 1, wherein said product comprises anhydrous calcium sulfate.
13. A process for making calcium sulfate, comprising
   a) providing calcium sulfate contaminated with about 0.1–4 wt % sulfuric acid,
   b) reacting said sulfuric acid with calcium carbonate having an average particle size of about 15 microns or less, thereby to form a product comprising calcium sulfate and water,
   c) removing said water from the product.

* * * * *